United States Patent
Kim (10) Patent No.: US 11,962,201 B2
(45) Date of Patent: Apr. 16, 2024

(54) MOTOR

(71) Applicant: LG INNOTEK CO., LTD., Seoul (KR)

(72) Inventor: Jin Yong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 430 days.

(21) Appl. No.: 17/289,053

(22) PCT Filed: Oct. 31, 2019

(86) PCT No.: PCT/KR2019/014537
§ 371 (c)(1),
(2) Date: Apr. 27, 2021

(87) PCT Pub. No.: WO2020/091438
PCT Pub. Date: May 7, 2020

(65) Prior Publication Data
US 2021/0408872 A1  Dec. 30, 2021

(30) Foreign Application Priority Data

Nov. 2, 2018  (KR) ........................ 10-2018-0133790

(51) Int. Cl.
*H02K 11/21*  (2016.01)
*G01D 5/14*  (2006.01)
(Continued)

(52) U.S. Cl.
CPC ........... *H02K 11/215* (2016.01); *G01D 5/142* (2013.01); *H02K 5/22* (2013.01); *H02K 11/30* (2016.01);
(Continued)

(58) Field of Classification Search
CPC ........ H02K 11/30; H02K 11/215; H02K 5/22; H02K 29/08; H02K 5/1735; H02K 7/085; H02K 21/22; G01D 5/142
See application file for complete search history.

(56) References Cited

U.S. PATENT DOCUMENTS

| | | | |
|---|---|---|---|
| 4,818,907 A | * | 4/1989 | Shirotori ............ G11B 19/2009 360/99.18 |
| 5,783,880 A | * | 7/1998 | Teshima ................... H02K 5/12 310/67 R |

(Continued)

FOREIGN PATENT DOCUMENTS

| | | |
|---|---|---|
| JP | 08-019238 | 1/1996 |
| JP | 11-089204 | 3/1999 |

(Continued)

OTHER PUBLICATIONS

International Search Report dated Feb. 7, 2020 issued in Application No. PCT/KR2019/014537.

*Primary Examiner* — Leda T Pham
(74) *Attorney, Agent, or Firm* — KED & ASSOCIATES, LLP (57) ABSTRACT

The present invention may provide a motor including a rotary shaft, a yoke coupled to the rotary shaft, a stator disposed between the rotary shaft and the yoke, a first magnet and a second magnet disposed in the yoke, and a circuit board on which a first Hall sensor is disposed to correspond to the first magnet and a second Hall sensor is disposed to correspond to the second magnet, wherein the second magnet includes a plurality of split magnets and one index magnet, a width of the split magnet in a circumferential direction is the same as a width of the index magnet in the circumferential direction, each of the split magnets and the index magnet are formed by combining a first pole and a second pole, a width of the first pole of the split magnet in the circumferential direction is the same as a width of the second pole in the circumferential direction, and a width of the first pole of the index magnet in the circumferential direction is different from a width of the second pole in the circumferential direction.

8 Claims, 13 Drawing Sheets

(51) Int. Cl.
*H02K 5/22* (2006.01)
*H02K 11/215* (2016.01)
*H02K 11/30* (2016.01)
*H02K 29/08* (2006.01)

(52) U.S. Cl.
CPC ......... *H02K 29/08* (2013.01); *H02K 2211/03* (2013.01); *H02K 2213/03* (2013.01)

(56) References Cited

U.S. PATENT DOCUMENTS

| | | | |
|---|---|---|---|
| 2007/0145839 A1* | 6/2007 | Kimura | H02K 19/103 310/68 B |
| 2016/0181888 A1* | 6/2016 | Kodani | H02K 1/22 310/68 B |

FOREIGN PATENT DOCUMENTS

| | | | |
|---|---|---|---|
| JP | 2001-045788 | | 2/2001 |
| KR | 10-2000-0000724 | | 1/2000 |
| KR | 10-2003-0063798 | | 7/2003 |

* cited by examiner

MOTOR

CROSS-REFERENCE TO RELATED PATENT APPLICATIONS

This application is a U.S. National Stage Application under 35 U.S.C. § 371 of PCT Application No. PCT/KR2019/014537, filed Oct. 31, 2019, which claims priority to Korean Patent Application No. 10-2018-0133790, filed Nov. 2, 2018, whose entire disclosures are hereby incorporated by reference.

TECHNICAL FIELD

The present invention relates to a motor.

BACKGROUND ART

A motor may include a rotor, a stator, and a rotary shaft. The rotary shaft is coupled to the rotor. The rotor may be disposed outside the stator. Due to an electromagnetic interaction between the rotor and the stator, the rotor is rotated, and when the rotor is rotated, the rotary shaft is rotated.

Such a motor may be used as a driving source configured to rotate a sensor device (for example, a light detection and ranging (LiDAR) device). The rotary shaft of the motor is connected to the sensor device. In order to secure the performance of the sensor device, constant speed driving of the motor is required. In addition, a plurality of sensor devices may be disposed, a plurality of motors may be disposed to correspond to the plurality of sensor devices, and in order to synchronize positions of the sensor devices, index signals are needed in the motors.

However, there is a problem in that separate devices should be installed to correspond to the motors in order to generate the index signals.

TECHNICAL PROBLEM

The present invention is directed to providing a motor capable of implementing constant speed driving and also generating an index signal without a separate additional device.

Objectives to be solved by the present invention are not limited to the above-described objectives, and other objectives which are not described above will be clearly understood by those skilled in the art from the following specification.

TECHNICAL SOLUTION

One aspect of the present invention provides a motor comprising a rotary shaft, a yoke coupled to the rotary shaft, a stator disposed between the rotary shaft and the yoke, a first magnet and a second magnet disposed in the yoke and a circuit board on which a first Hall sensor is disposed to correspond to the first magnet and a second Hall sensor is disposed to correspond to the second magnet, wherein the second magnet includes a plurality of split magnets and one index magnet, a width of the split magnet in a circumferential direction is the same as a width of the index magnet in the circumferential direction, each of the split magnets and the index magnet are formed by combining a first pole and a second pole, a width of the first pole of the split magnet in the circumferential direction is the same as a width of the second pole in the circumferential direction, and a width of the first pole of the index magnet in the circumferential direction is different from a width of the second pole in the circumferential direction.

A ratio of a width of the N-pole to a width of the S-pole is N:M, a sum of the N and the M is 10, the N is in a range of 3.1 to 3.9 and the M is in a range of 6.1 to 6.9.

A distance between the second sensor and the second magnet in a shaft direction is in a range of 1 mm to 2.6 mm.

A value of a magnetic flux of the second magnet is in a range of 8450 mG to 8550 mG.

A distance between the first magnet and the second magnet in a shaft direction is in a range of 0.5 mm to 1.0 mm and a distance between the first magnet and the second magnet in the circumferential direction is in a range of 5.7 mm to 7.7 mm.

A controller is disposed on the circuit board; and when a change in magnetic flux or pulse generated due to the index magnet is detected among a change in magnetic flux or pulse detected by the second Hall sensor, the controller generates an index signal.

One aspect of the present invention provides a motor a motor comprising, a rotary shaft, a yoke coupled to the rotary shaft, a stator disposed between the rotary shaft and the yoke, a first magnet and a second magnet disposed in the yoke and a circuit board on which a first Hall sensor is disposed to correspond to the first magnet and a second Hall sensor is disposed to correspond to the second magnet, wherein the second magnet includes a plurality of split magnets and one index magnet, an area of the split magnet is the same as an area of the index magnet, each of the split magnets and the index magnet is formed by combining a first pole and a second pole divided in a circumferential direction, an area of the first pole is the same as an area of the second pole in the split magnet and an area of the first pole is different from an area of the second pole in the index magnet.

A ratio of an area of the N-pole to an area of the S-pole is N:M, a sum of the N and the M is 10, the N is in a range of 3.1 to 3.9; and the M is in a range of 6.1 to 6.9.

A distance between the second sensor and the second magnet in a shaft direction is in a range of 1 mm to 2.6 mm.

A distance between the first magnet and the second magnet in a shaft direction is in a range of 0.5 mm to 1.0 mm and a distance between the first magnetic and the second magnet in the circumferential direction is in a range of 5.7 mm to 7.7 mm.

ADVANTAGEOUS EFFECTS

According to embodiments, an advantageous effect is provided in that a precise constant speed driving condition is satisfied.

An advantageous effect is provided in that an index signal is generated without adding a separate device.

MODES OF THE INVENTION

Hereinafter, exemplary embodiments of the present invention will be described with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Figure 1:
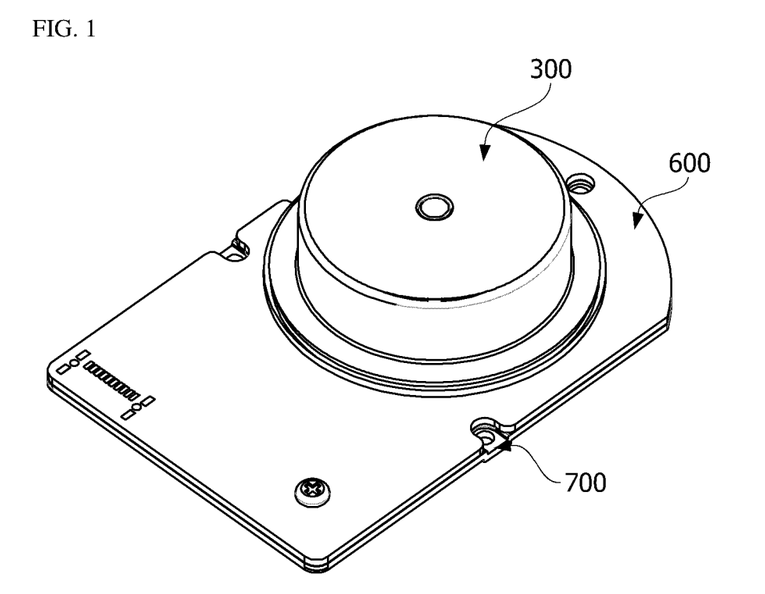
FIG. 1 is a perspective view illustrating a motor according to an embodiment.
Figure 2:
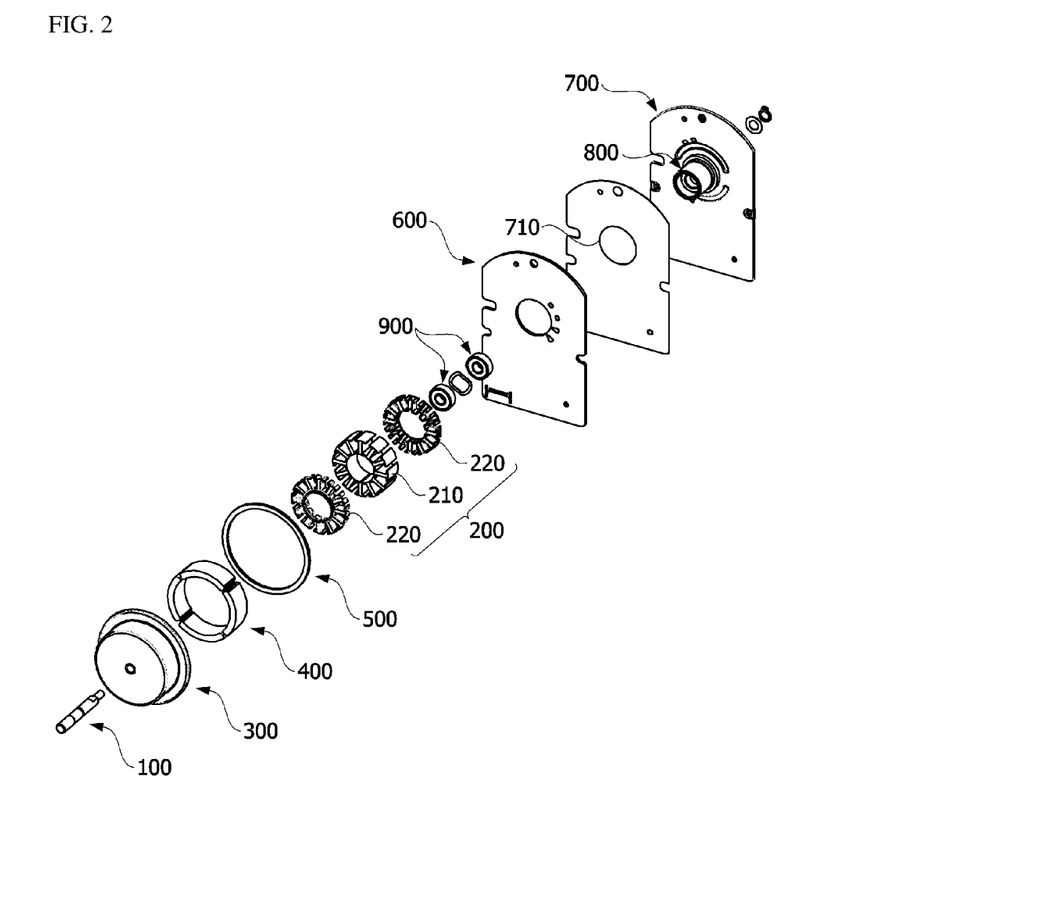
FIG. 2 is an exploded perspective view illustrating the motor illustrated in FIG. 1.
Figure 3:
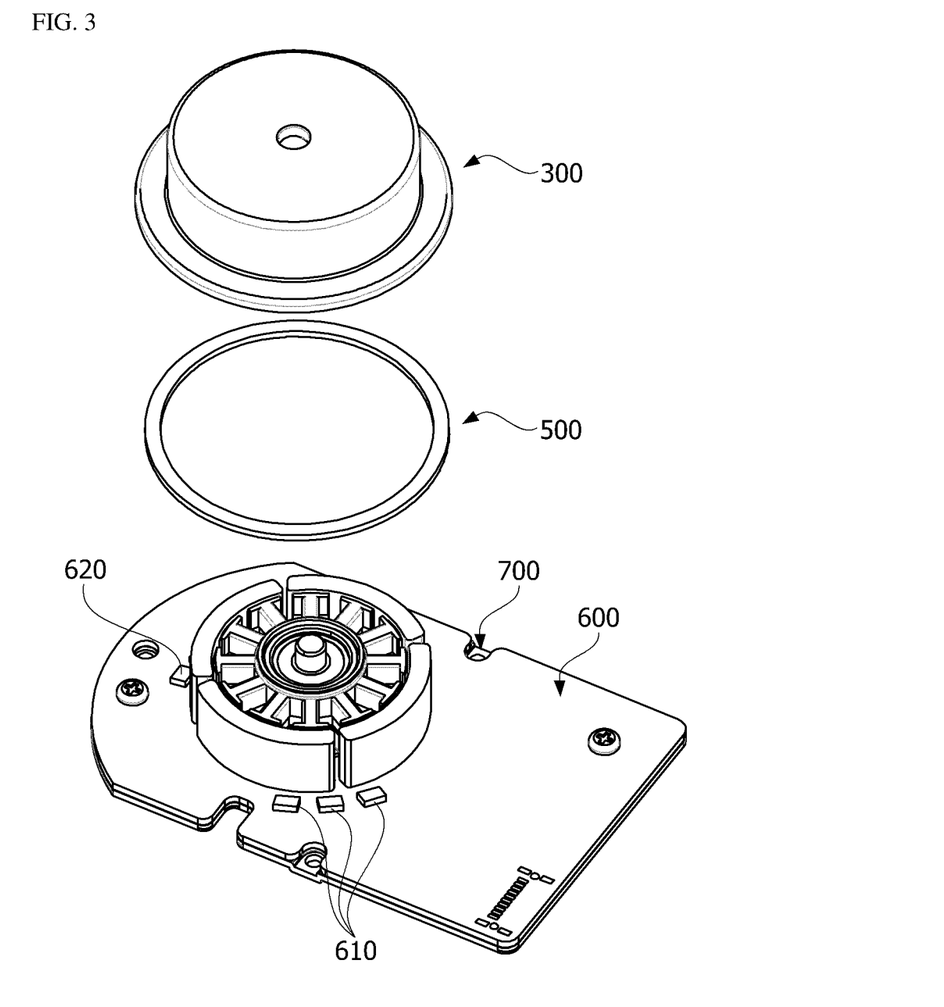
FIG. 3 is a view illustrating a yoke illustrated in FIG. 2.

FIG. 1 is a cross-sectional view illustrating a motor according to an embodiment, FIG. 2 is an exploded perspective view illustrating the motor illustrated in FIG. 1, and FIG. 3 is a view illustrating a yoke illustrated in FIG. 2.

Referring to FIGS. 1 to 3, the motor according to the embodiment may include a rotary shaft 100, a stator 200, a yoke 300, a first magnet 400, a second magnet 500, a circuit board 600, a base 700, a bearing housing 800, and bearings 900.

The rotary shaft 100 is coupled to the yoke 300. The rotary shaft 100 rotates along with the yoke 300. A front end of the rotary shaft 100 may be connected to a sensor device configured to obtain distance information.

The stator 200 is disposed outside the rotary shaft 100. The stator 200 includes a core 210. The core 210 includes a plurality of teeth. Coils are wound around the teeth. The stator 200 may include an insulator 220. The insulator 220 is coupled to the core 210. The insulator 220 may include two parts coupled to an upper portion and a lower portion of the core 210.

The yoke 300 is disposed outside the stator 200. In addition, the yoke 300 is coupled to the rotary shaft 100. The rotary shaft 100 is positioned at a center of the yoke 300. When the yoke 300 rotates, the rotary shaft 100 also rotates along therewith.

The first magnet 400 may be disposed inside the yoke 300. The first magnet 400 is for driving the yoke 300. Due to an electromagnetic interaction between the first magnet 400 and the coil wound around the stator 200, the yoke 300 is rotated. The first magnet 400 may be one annular member. The first magnet 400 may be a magnet in which a plurality of split magnets are combined.

The second magnet 500 may be disposed on a circumference of the yoke 300. The second magnet 500 is for detecting a position of the yoke 300 and may detect one rotation of the motor and use the one rotation to implement constant speed driving of the motor. The second magnet 500 may have an annular shape. The second magnet 500 may include a plurality of split magnets.

The circuit board 600 is disposed under the stator 200. The circuit board 600 may include first Hall sensors 610 and second Hall sensors 620. The first Hall sensor 610 detects a magnetic flux of the first magnet 400. The second Hall sensor 620 detects a magnetic flux of the second magnet 500. The first Hall sensor 610 may be disposed under the first magnet 400. In addition, the second Hall sensor 620 may be disposed under the second magnet 500. A hole through which the bearing housing 800 passes may be disposed in the circuit board 600.

The base 700 is disposed under the circuit board 600. The circuit board 600 may be disposed on an upper surface of the base 700. An adhesive film 710 for coupling the base 700 and the circuit board 600 may be positioned between the base 700 and the circuit board 600. A hole through which the bearing housing 800 passes may be disposed in the base 700.

Figure 4:
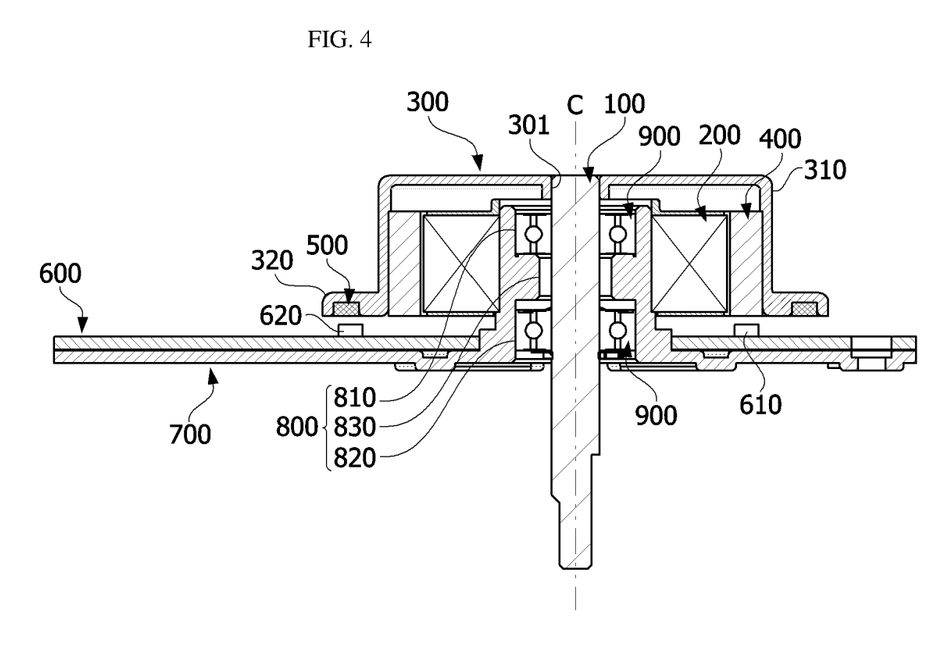
FIG. 4 is a side cross-sectional view illustrating the motor illustrated in FIG. 1.

FIG. 4 is a side cross-sectional view illustrating the motor illustrated in FIG. 1.

Referring to FIGS. 2 and 4, the bearing housing 800 includes the bearings 900 therein. The bearings 900 rotatably support the rotary shaft 100. The bearings 900 may be disposed on an upper portion and a lower portion of the bearing housing 800.

The bearing housing 800 may include a first accommodation portion 810 and a second accommodation portion 820 therein. The bearing 900 is disposed in the first accommodation portion 810. The bearing 900 is also disposed in the second accommodation portion 820. A partition wall 830 may be disposed between the first accommodation portion 810 and the second accommodation portion 820. The partition wall 830 protrudes in the bearing housing 800 to divide the first accommodation portion 810 from the second accommodation portion 820 and support an outer wheel of the bearing 900 in a shaft direction.

Meanwhile, the bearing housing 800 is fixed to the base 700. In addition, the bearing housing 800 is coupled to a center of the core 210 of the stator 200.

Referring to FIGS. 3 and 4, the yoke 300 includes a body 310 having a cylindrical shape and a flange 320. An upper side of the body 310 has a shape blocked by an upper surface of the body 310, and a lower side of the body 310 has an open shape. The flange 320 has a shape horizontally extending from a lower end of the body 310. The rotary shaft 100 is coupled to the upper surface of the body 310 so that the rotary shaft 100 and the yoke 300 are integrally rotated. A hole 301 is disposed at a center of the upper surface of the body 310. An end portion of the rotary shaft 100 may be press-fitted and coupled to the hole 301.

The first magnet 400 is coupled to an inner circumferential surface of the body 310. In addition, the second magnet 500 is coupled to a lower surface of the flange 320.

Figure 5:
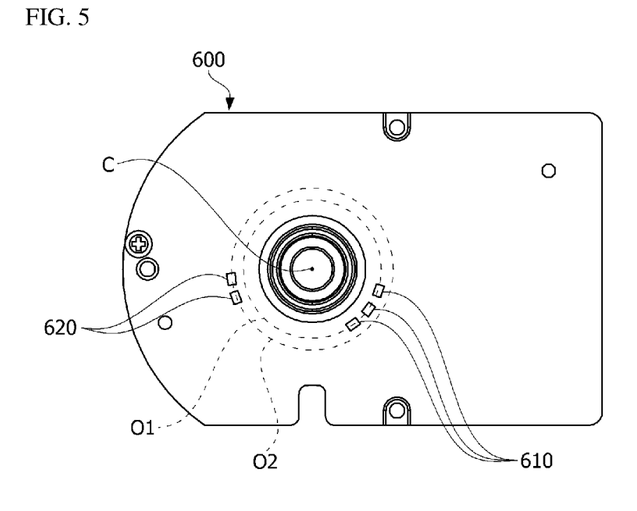
FIG. 5 is a view illustrating a circuit board including a first Hall sensor and a second Hall sensor.
Figure 6:
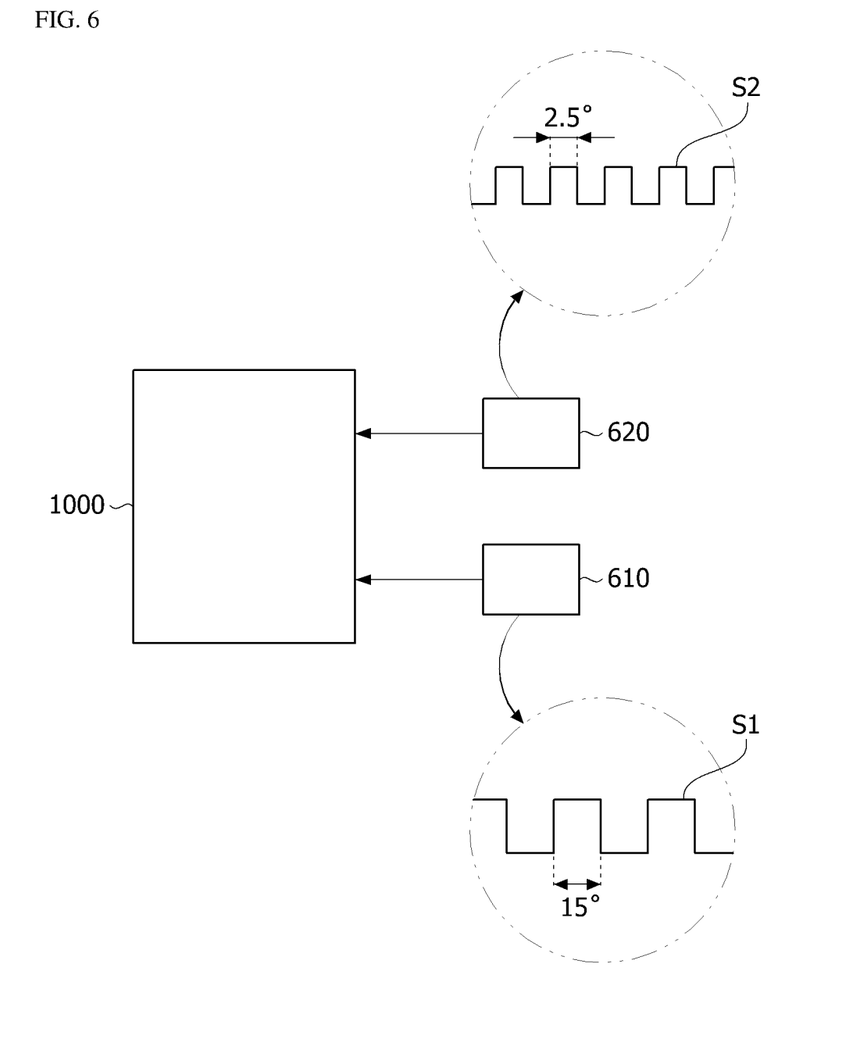
FIG. 6 is a view illustrating a controller, the first Hall sensor, and the second Hall sensor.

FIG. 5 is a view illustrating the circuit board including the first Hall sensor and the second Hall sensor, and FIG. 6 is a view illustrating a controller, the first Hall sensor, and the second Hall sensor.

Referring to FIGS. 4 to 6, the first Hall sensor 610 is positioned under the first magnet 400. The first Hall sensor 610 may be disposed on a rotation orbit O1 of the first magnet 400 about a rotation center C of the yoke 300. Three first Hall sensors 610 may be disposed. Three first Hall sensors 610 generate three sensing signals. A controller 1000 of the motor determines a position of the yoke 300 on the basis of the sensing signals generated by the first Hall sensors 610. For example, in a case in which the first magnet 400 has eight poles, and the number of the first Hall sensors 610 is three, an angle unit of rotation measurement is 15° based on one rotation) (360°) of the yoke 300. A sensing signal S1 generated by three first Hall sensors 610 has a pulse waveform in each rotation angle of 15°. However, in a case in which the angle unit of rotation measurement is 15°, it is difficult to precisely measure constant speed driving of the motor. Accordingly, the constant speed driving of the motor is more precisely determined through the second magnet 500 and the second Hall sensor 620.

The second Hall sensor 620 is positioned under the second magnet 500. The second Hall sensor 620 may be disposed on a rotation orbit O2 of the second magnet 500 around a rotation center of the second magnet 500. The second Hall sensor 620 may be disposed outside the first Hall sensor 610 in a radial direction from a rotation center of the yoke 300. The second Hall sensor 620 may be provided as a plurality of second Hall sensors 620. Since the second magnet 500 includes a plurality of split magnets, the second Hall sensors 620 generate a sensing signal S2 having a pulse waveform of which a cycle is shorter than a cycle of the sensing signal generated by the first Hall sensors 610. The controller 1000 of the motor may detect constant speed driving of the motor on the basis of the sensing signal generated by the second Hall sensors 620. For example, in a case in which the second magnet 500 has 72 poles, and the number of the second Hall sensors 620 is two, an angle unit of rotation measurement is 2.5° based on one rotation (360°) of the yoke 300. Accordingly, since the sensing signal S2 generated by two second Hall sensors 620 has a pulse waveform in each angle unit of rotation measurement of 2.5°, revolutions per minute may be checked more precisely.

Figure 7:
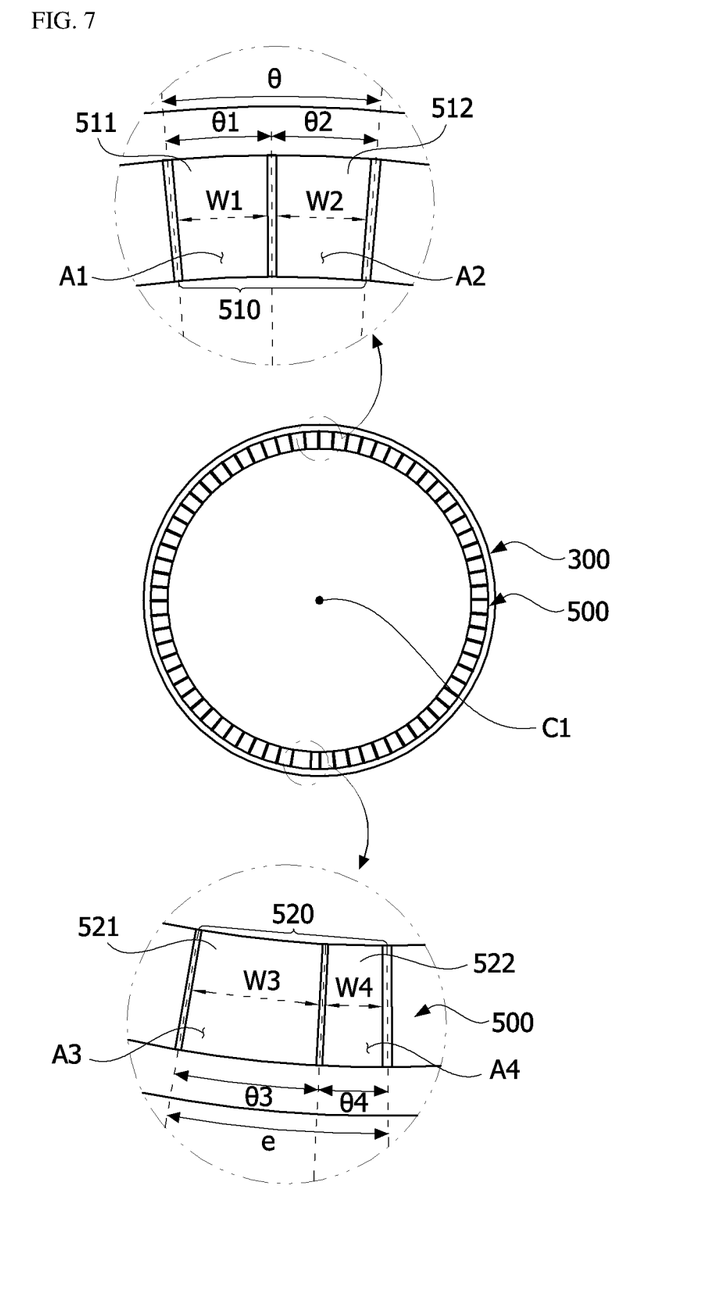
FIG. 7 is a view illustrating a second magnet.

FIG. 7 is a view illustrating the second magnet.

Referring to FIG. 7, the second magnet 500 may include a plurality of split magnets 510 divided at a first angle $\Theta$ in a rotation center C1 in a circumferential direction. The split magnets 510 may be formed to be divided into first poles 511 and second poles 512 in the circumferential direction. In this case, the first pole 511 may be an S-pole. In addition, the second pole 512 may be an N-pole. However, the first pole 511 may also be an N-pole, and the second pole 512 may also be an S-pole.

The first pole 511 of the split magnet 510 may be distinguished to be divided into a first-1 angle $\Theta 1$ in the circumferential direction. In addition, the second pole 512 of the split magnet 510 may be distinguished to be divided into a first-2 angle $\Theta 2$ in the circumferential direction. In this case, the first-1 angle $\Theta 1$ may be the same as the first-2 angle $\Theta 2$.

In the split magnet 510, a width W1 of the first pole 511 in the circumferential direction may be the same as a width W2 of the second pole 512 in the circumferential direction. In this case, the widths W1 and W2 in the circumferential direction may be widths based on a midpoint of the second magnet 500 from the rotation center C1 in the radial direction of the second magnet 500.

Alternatively, an area A1 of the first pole 511 may be the same as an area A2 of the second pole 512 in the split magnet 510.

In addition, the second magnet 500 may include one index magnet 520. Since the index magnet 520 is divided at a first angle $\Theta$, the index magnet 520 is distinguished from the plurality of split magnets 510. The index magnet 520 may be formed to be divided into a first pole 521 and a second pole 522 in the circumferential direction. The first pole 521 of the index magnet 520 may be distinguished to be divided at a first-3 angle $\Theta 3$ in the circumferential direction. In addition, the second pole 522 of the index magnet 520 may be distinguished to be divided at a first-4 angle $\Theta 4$ in the circumferential direction. In this case, unlike the split magnet 510, the first-3 angle $\Theta 3$ of the index magnet 520 is greater than the first-4 angle $\Theta 4$. This means that a width of the first pole 521 of the index magnet 520 is increased to generate a reference pulse to detect one rotation (360°) of the yoke 300 of the motor.

A width W3 of the first pole 521 in the circumferential direction may be greater than a width W4 of the second pole 522 in the circumferential direction in the index magnet 520. In this case, the widths W3 and W4 in the circumferential direction may be widths based on a midpoint of the second magnet 500 from the rotation center C1 in the radial direction of the second magnet 500.

Alternatively, an area A3 of the first pole 521 may be greater than an area A4 of the second pole 522 in the index magnet 520.

Figure 8:
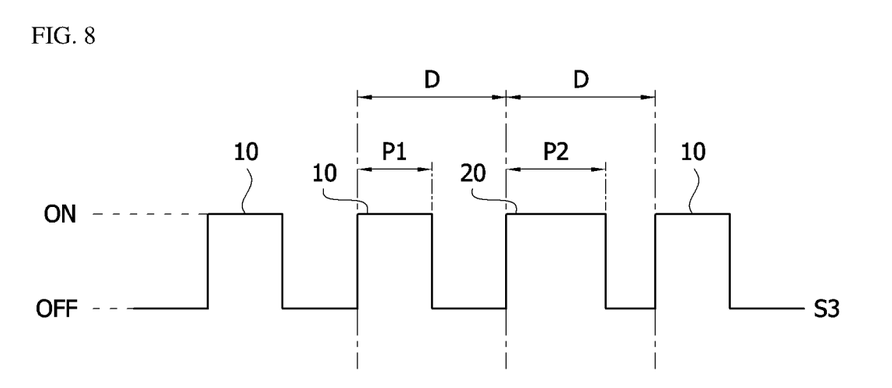
FIG. 8 is a view illustrating a sensing signal.

FIG. 8 is a view illustrating a sensing signal.

Referring to FIGS. 7 and 8, the sensing signal detected by the second Hall sensor 620 is a pulse width modulation (PWM) signal S3. The controller 1000 may output a signal detected by the second Hall sensor 620 as the PWM signal S3 in which a high signal and a low signal are periodically repeated.

For example, in a case in which the second magnet 500 has 72 poles, and the number of the second Hall sensors 620 is two, when the yoke rotates one time, 146 pulses are generated in the PWM signal S3, that is, 144 first pulses 10 and 2 second pulses 20 are generated. The first pulses 10 are generated due to the split magnets 510 and the second pulse 20 are generated due to the index magnet 520. A duty value D of the first pulse 10 is the same as that of the second pulse 20. Widths P1 of the first pulses 10 may be the same, and a duty cycle thereof may be 50%.

The second pulse 20 is generated when the index magnet 520 passes the second Hall sensor 620. A width P2 of the second pulse 20 is greater than the width P1 of the first pulse 10. This is because the width W3 or the area A3 of the first pole 521 of the index magnet 520 is greater than the width W1 or the area A1 of the first pole 511 of the split magnet 510.

Meanwhile, in the index magnet 520, a ratio of the width W3 of the first pole 521 to the width W4 of the second pole 522 may be N:M, the sum of N and M may be 10, N may be in the range of 3.1 to 3.9, and M may be in the range of 6.1 to 6.9. For example, in the index magnet 520, the ratio of the width W3 of the first pole 521 to the width W4 of the second pole 522 may be 7:3.

Alternately, in the index magnet 520, a ratio of the area A3 of the first pole 521 to the area A4 of the second pole 522 may be N:M, the sum of N and M may be 10, N may be in the range of 3.1 to 3.9, and M may be in the range of 6.1 to 6.9. For example, in the index magnet 520, a ratio of the area A3 of the first pole 521 to the area A4 of the second pole 522 may be 7:3.

In a case in which the N is greater than 3.9, or the M is less than 6.1, since the first pole 521 is not clearly distinguished from the second pole 522, there is a problem in that it is difficult for the controller 1000 to detect a magnetic flux generated by the index magnet 520 which is contrast with the split magnet 510.

In addition, in a case in which the N is less than 3.1, or the M is greater than 6.9, there is a problem in that it is difficult to recognize a magnetic flux generated by the first pole 521. In this case, in order to recognize the magnetic flux generated by the first pole 521, a distance between the second magnet 500 and the second Hall sensor 620 should be significantly reduced. In this case, there is a high risk that second magnet 500 comes into contact with the second Hall sensor 620.

Figure 9:
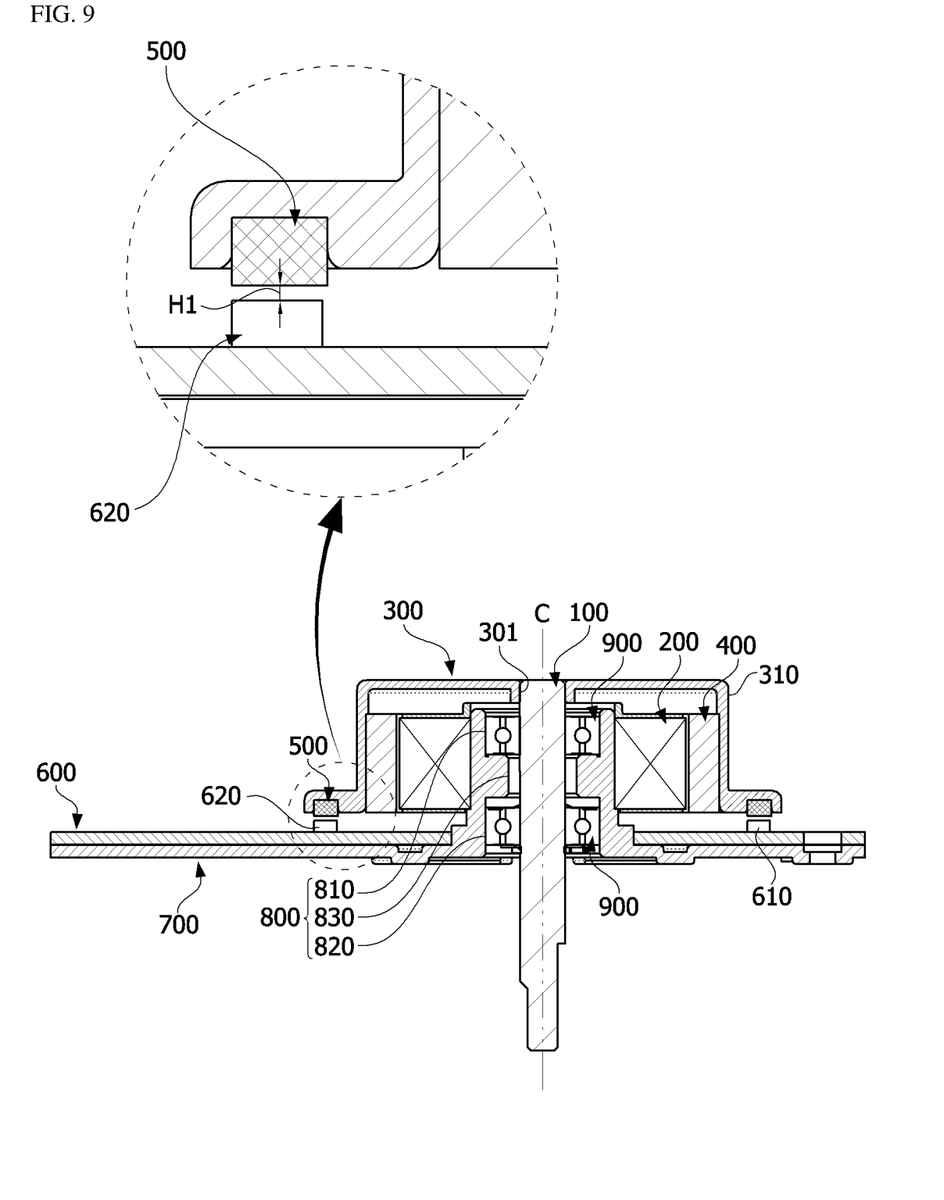
FIG. 9 is a view illustrating a distance between a second sensor and the second magnet in a shaft direction.

FIG. 9 is a view illustrating a distance between the second sensor and the second magnet in the shaft direction, and FIG. 11 is a set of comparison graphs showing detected magnetic fluxes generated by the index magnet according to the distance between the second sensor and the second magnet.

Referring to FIG. 9, a distance H1 between the second Hall sensor 620 and the second magnet 500 in the shaft direction may be in the range of 0.5 mm to 1.6 mm. In this case, a value of a magnetic flux of the second magnet 500 may be in the range of 8450 mG to 8550 mG. When the distance H1 between the second Hall sensor 620 and the second magnet 500 in the shaft direction is less than 0.5 mm, there is a high risk that the second Hall sensor 620 comes into contact with the second magnet 500. In addition, when the distance H1 between the second Hall sensor 620 and the second magnet 500 in the shaft direction is greater than 0.5 mm, there is a problem in that it is difficult to recognize a magnetic flux generated by the second pole 522 of the index magnet.

Figure 11A:
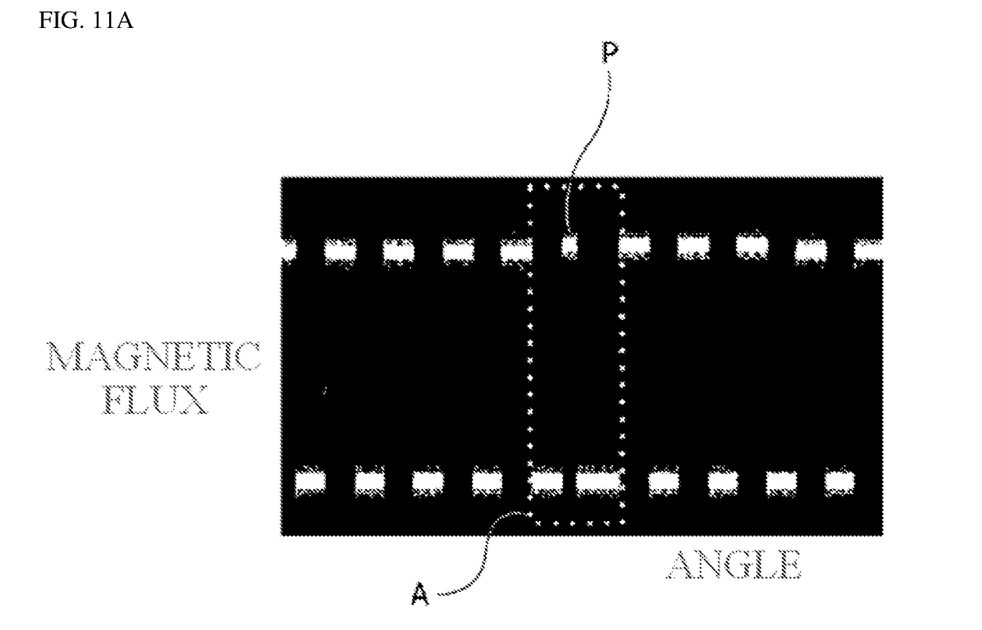
FIGS. 11A and 11B are views illustrating a distance in the shaft direction and a distance in a radial direction between a lower end of a first magnet and the second magnet.
Figure 11B:
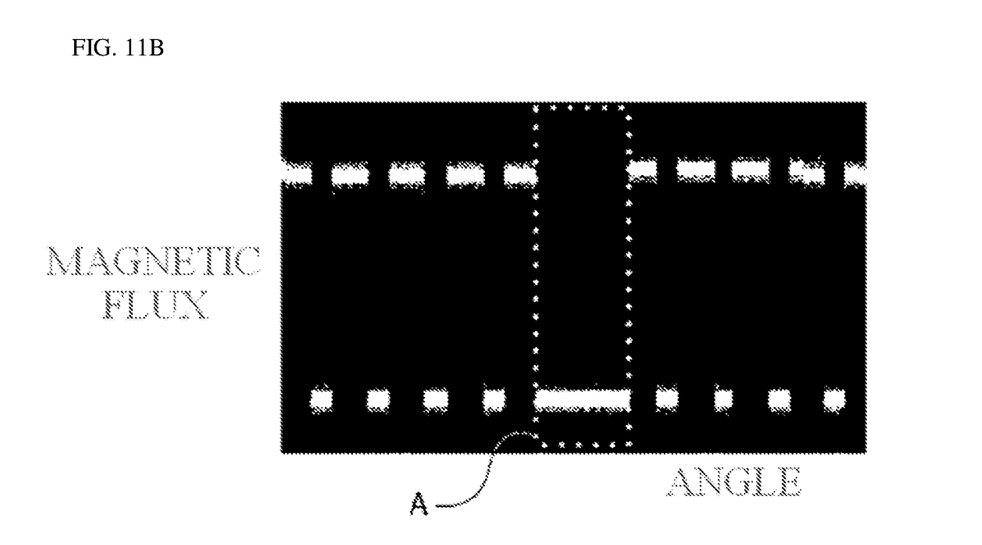

Referring to FIG. 11A, a section A of FIG. 11 is a detection section of a magnetic flux generated by the index magnet 520. In a case in which the distance H1 between the second Hall sensor 620 and the second magnet 500 in the shaft direction is in the range of 0.5 mm to 1.6 mm, the magnetic flux generated by the second pole 522 of the index magnet 520 is detected like a portion P of FIG. 11. On the contrary, referring to FIG. 11B, in a case in which the distance H1 between the second Hall sensor 620 and the second magnet 500 in the shaft direction is greater than 2.6 mm, the magnetic flux generated by the second pole 522 of the index magnet 520 is not detected.

Figure 10:
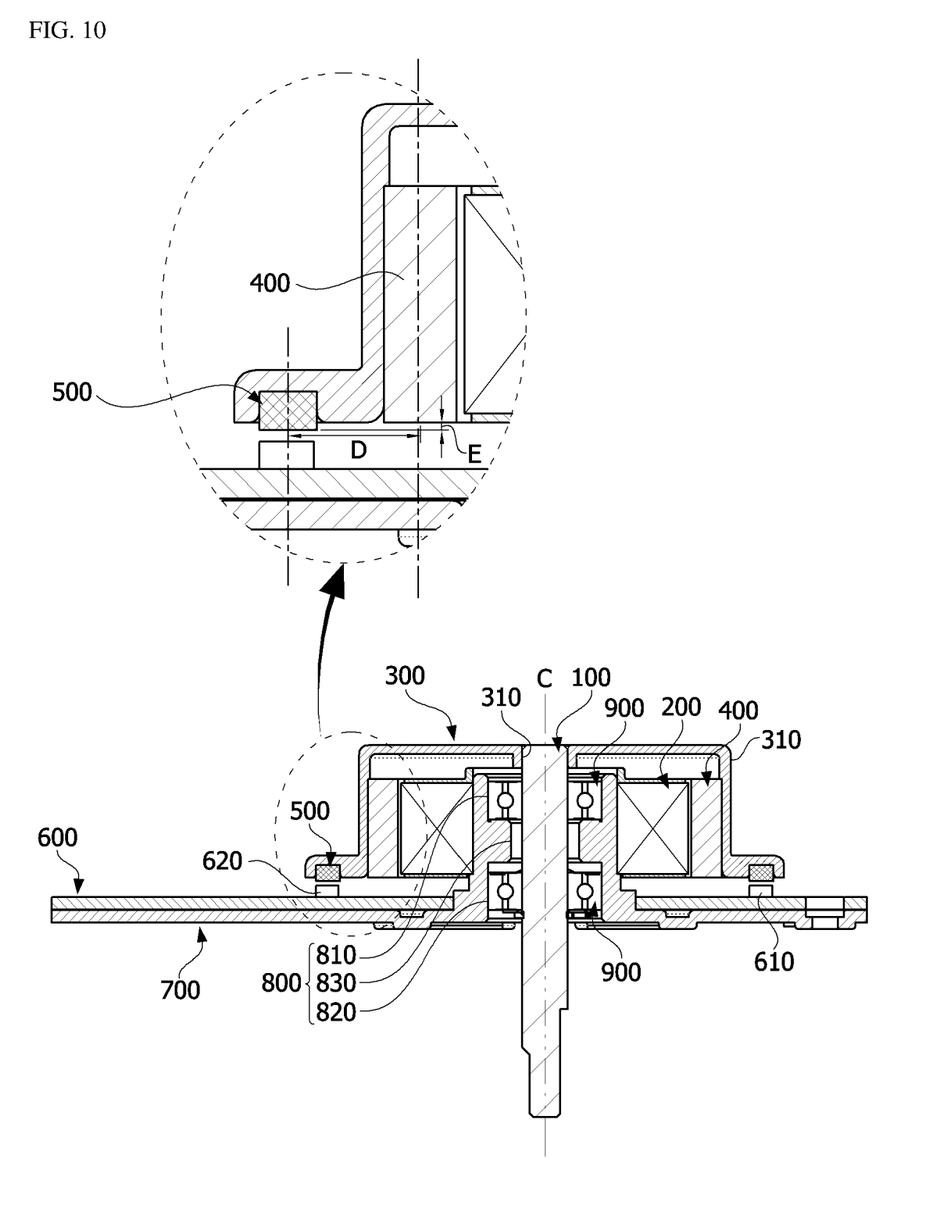
FIG. 10 is a set of comparison graphs showing detected magnetic fluxes generated by an index magnet according to a distance between the second sensor and the second magnet.

FIG. 10 is a view illustrating a distance in the shaft direction and a distance in the radial direction between a lower end of the first magnet and the second magnet, and FIG. 12 is a set of comparison graphs showing detected magnetic fluxes generated by the second magnet according to the distance in the shaft direction and the distance in the radial direction between the first magnet and the second magnet.

Referring to FIG. 10, a distance E between the first magnet 400 and the second magnet 500 in the shaft direction may be in the range of 0.5 mm to 1.6 mm. The distance E in the shaft direction denotes a height difference between a lower end of the first magnet 400 and a lower end of the second magnet 500. In addition, a distance D between the first magnet 400 and the second magnet 500 in the radial direction may be in the range of 5.7 mm to 7.7 mm.

In this case, the value of the magnetic flux of the second magnet 500 may be in the range of 8450 mG to 8550 mG.

Figure 12A:
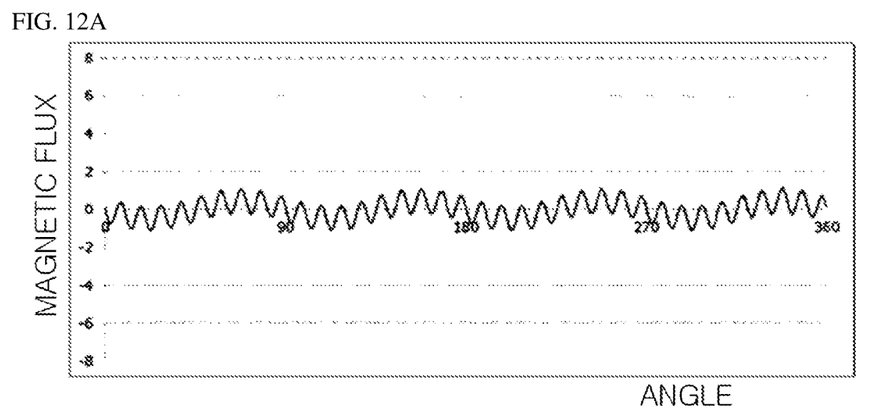
FIGS. 12A and 12B are a set of comparison graphs showing detected magnetic fluxes generated by the second magnet according to a distance in the shaft direction and a distance in the radial direction between the first magnet and the second magnet.

Referring to FIG. 12A, in a case in which the distance E between the first magnet 400 and the second magnet 500 in the shaft direction is less than 0.5 mm, and the distance D between the first magnet 400 and the second magnet 500 in the radial direction is less than 5.7, a magnetic flux detected by the second magnet 500 is abnormally non-uniform. This means that the second Hall sensor 620 may not detect a change in magnetic flux generated by the second magnet 500 normally.

Figure 12B:
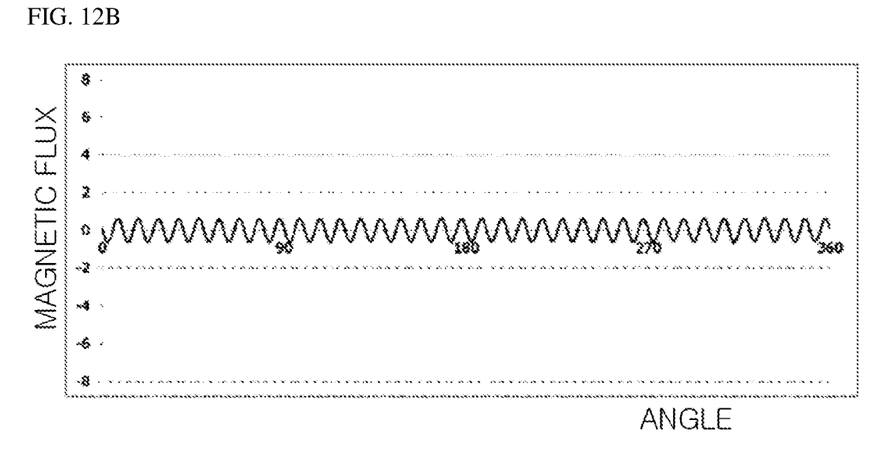

However, referring to FIG. 12B, in a case in which the distance E between the first magnet 400 and the second magnet 500 in the shaft direction is in the range of 0.5 mm to 1.6 mm, and the distance D between the first magnet 400 and the second magnet 500 in the radial direction is in the range of 5.7 mm to 7.7 mm, a magnetic flux detected by the second magnet 500 is uniform normally.

Figure 13:
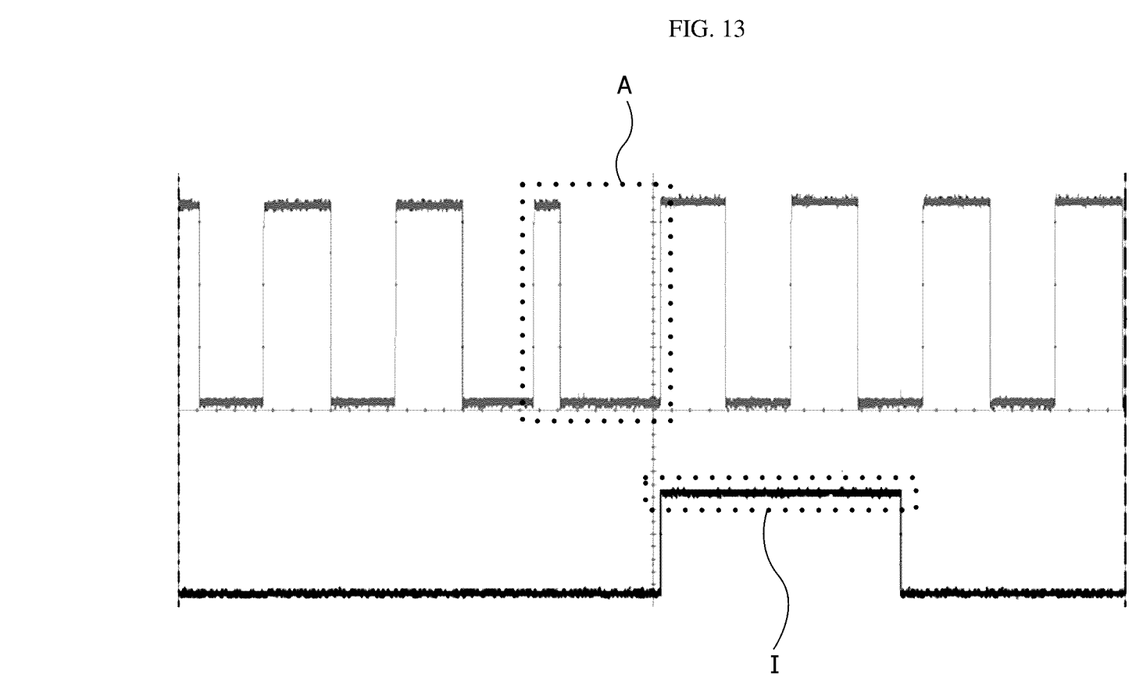
FIG. 13 is a graph showing a signal due to an index magnet and an index signal.

FIG. 13 is a graph showing a signal due to the index magnet and an index signal.

Referring to FIG. 13, like a section A of FIG. 13, a signal (a change in magnetic flux or modulated pulse due to the second pole 522) due to the index magnet 520 is generated for each one rotation of the motor. In a case in which a signal due to the index magnet 520 is detected by the second Hall sensor 620 in the section A of FIG. 13, the controller 1000 may generate an index signal I. The second magnet 500 provided for constant speed driving of the motor may be used to generate the index signal I even without an additional separate device.

As described above, the motor according to one exemplary embodiment of the present invention has been specifically described with reference to the accompanying drawings.

The above-described embodiments should be considered in a descriptive sense only and not for purposes of limitation, and the scope of the present invention is defined not by the detailed description but by the appended claims. In addition, it should be interpreted that the scope of the present invention encompasses all modifications and alterations derived from meanings and the scope and equivalents of the appended claims.

The invention claimed is:

1. A motor comprising:
a rotary shaft;
a yoke coupled to the rotary shaft;
a stator disposed between the rotary shaft and the yoke;
a first magnet and a second magnet disposed in the yoke; and
a circuit board on which a first Hall sensor is disposed to correspond to the first magnet and a second Hall sensor is disposed to correspond to the second magnet,
wherein the second magnet is disposed outside the first magnet in a radial direction,
wherein the second magnet includes a plurality of split magnets and one index magnet,
a width of the split magnet in a circumferential direction is the same as a width of the index magnet in the circumferential direction,
each of the split magnets and the index magnet are formed by combining a first pole and a second pole,
a width of the first pole of the split magnet in the circumferential direction is the same as a width of the second pole of the split magnet in the circumferential direction, and
a width of the first pole of the index magnet in the circumferential direction is different from a width of the second pole of the index magnet in the circumferential direction,
wherein a ratio of a width of the first pole of the index magnet to a width of the second pole of the index magnet is N:M;
a sum of the N and the M is 10;
the N is in a range of 3.1 to 3.9; and
the M is in a range of 6.1 to 6.9.

2. The motor of claim 1, wherein a distance between the second Hall sensor and the second magnet in a shaft direction is in a range of 1 mm to 2.6 mm.

3. The motor of claim 1, wherein a value of a magnetic flux of the second magnet is in a range of 8450 mG to 8550 mG.

4. The motor of claim 1, wherein:
a distance between the first magnet and the second magnet in a shaft direction is in a range of 0.5 mm to 1.0 mm; and
a distance between the first magnet and the second magnet in the circumferential direction is in a range of 5.7 mm to 7.7 mm.

5. The motor of claim 1, wherein:
a controller is disposed on the circuit board; and
when a change in magnetic flux or pulse generated due to the index magnet is detected among a change in magnetic flux or pulse detected by the second Hall sensor, the controller generates an index signal.

6. A motor comprising:
a rotary shaft;
a yoke coupled to the rotary shaft;
a stator disposed between the rotary shaft and the yoke;
a first magnet and a second magnet disposed in the yoke; and
a circuit board on which a first Hall sensor is disposed to correspond to the first magnet and a second Hall sensor is disposed to correspond to the second magnet,
wherein the second magnet is disposed outside the first magnet in a radial direction,
wherein the second magnet includes a plurality of split magnets and one index magnet,
an area of the split magnet is the same as an area of the index magnet,
each of the split magnets and the index magnet is formed by combining a first pole and a second pole divided in a circumferential direction;
an area of the first pole is the same as an area of the second pole in the split magnet; and
an area of the first pole is different from an area of the second pole in the index magnet,
wherein a ratio of an area of the first pole of the index magnet to an area of the second pole of the index magnet is N:M;
a sum of the N and the M is 10;
the N is in a range of 3.1 to 3.9; and
the M is in a range of 6.1 to 6.9.

7. The motor of claim 6, wherein a distance between the second Hall sensor and the second magnet in a shaft direction is in a range of 1 mm to 2.6 mm.

8. The motor of claim 6, wherein:
a distance between the first magnet and the second magnet in a shaft direction is in a range of 0.5 mm to 1.0 mm; and
a distance between the first magnet and the second magnet in the circumferential direction is in a range of 5.7 mm to 7.7 mm.

* * * * *